United States Patent
Nace

(10) Patent No.: US 8,825,783 B1
(45) Date of Patent: Sep. 2, 2014

(54) RECORDING EVENTS FOR SOCIAL MEDIA

(75) Inventor: Adam M. Nace, Bright (CA)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/551,414

(22) Filed: Jul. 17, 2012

(51) Int. Cl.
*G06F 15/16* (2006.01)

(52) U.S. Cl.
USPC .................................................. 709/206

(58) Field of Classification Search
CPC .............................. H04L 12/588; H04L 51/32
USPC .................. 709/204–207, 217–219; 705/319
See application file for complete search history.

(56) References Cited

U.S. PATENT DOCUMENTS

| | | | |
|---|---|---|---|
| 8,108,778 B2 * | 1/2012 | Athsani et al. ................ 715/738 |
| 2008/0204317 A1 * | 8/2008 | Schreve et al. ............ 342/357.13 |
| 2009/0150433 A1 * | 6/2009 | Uusitalo et al. ............ 707/104.1 |
| 2012/0123830 A1 * | 5/2012 | Svendsen et al. ............ 705/14.5 |
| 2012/0308077 A1 * | 12/2012 | Tseng ............................. 382/103 |
| 2013/0066963 A1 * | 3/2013 | Odio et al. ..................... 709/204 |
| 2013/0117365 A1 * | 5/2013 | Padmanabhan et al. ...... 709/204 |
| 2013/0117692 A1 * | 5/2013 | Padmanabhan et al. ...... 715/753 |
| 2013/0128038 A1 * | 5/2013 | Cok et al. ...................... 348/143 |
| 2013/0311452 A1 * | 11/2013 | Jacoby .......................... 707/722 |

* cited by examiner

*Primary Examiner* — Brendan Higa
(74) *Attorney, Agent, or Firm* — Patent Law Works LLP

(57) ABSTRACT

This specification describes technologies relating to recording an event album for sharing through a social network. In general, one aspect of the subject matter described in this specification can be embodied in methods that include receiving a signal indicating a check-in and transmitting a first message including a check-in status update generated at least in part based on the check-in. The methods may further include starting a recording session associated with the check-in and recording media files during the recording session. The methods may further include automatically associating the media files with the check-in. The methods may further include transmitting the media files in one or more additional messages associated with the check-in status update.

35 Claims, 7 Drawing Sheets

RECORDING EVENTS FOR SOCIAL MEDIA

BACKGROUND

Social networks permit users to post information about themselves and to communicate with other people, e.g., their friends, family, and co-workers. Some social networks permit users to specify social connections with other users.

Additionally, some social networks allow users to post status updates about themselves. Status updates for a user may be organized in a chronological stream and presented to other users with access and interest. One type of status update is a check-in status update, which tells other users that a certain user is present at certain location, (e.g., a stadium, a restaurant, or a club).

Some social networks also allow users to post pictures and other media files as part of their online profile.

SUMMARY

This specification describes technologies relating to recording an event album for sharing through a social network. In general, one aspect of the subject matter described in this specification can be embodied in a method that includes receiving, using one or more data processing apparatuses, a signal indicating a check-in. The method may further include transmitting, using one or more data processing apparatuses, a first message including a check-in status update generated at least in part based on the check-in. The method may further include starting, using one or more data processing apparatuses, a recording session associated with the check-in. The method may further include recording, using one or more data processing apparatuses, media files during the recording session. The method may further include automatically associating the media files with the check-in. The method may further include transmitting, using one or more data processing apparatuses, the media files in one or more additional messages associated with the check-in status update.

In general, one aspect of the subject matter described in this specification can be embodied in a system that includes a user interface configured to receive a signal indicating a check-in. The system may further include a module configured to start a recording session associated with the check-in. The system may further include a sensor configured to record media files during the recording session. The system may further include a module configured to automatically associate the media files with the check-in. The system may further include a wireless network interface configured to transmit a first message including a check-in status update generated at least in part based on the check-in and to later transmit the media files in one or more additional messages associated with the check-in status update.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including receiving a signal indicating a check-in. The operations may further include transmitting a first message including a check-in status update generated at least in part based on the check-in. The operations may further include starting a recording session associated with the check-in. The operations may further include recording media files during the recording session. The operations may further include automatically associating the media files with the check-in. The operations may further include transmitting the media files in one or more additional messages associated with the check-in status update.

In general, one aspect of the subject matter described in this specification can be embodied in a system that includes a user interface configured to receive a signal indicating a check-in. The system may further include a module configured to start a recording session associated with the check-in. The system may further include a sensor configured to record media files during the recording session. The system may further include a module configured to automatically associate the media files with the check-in. The system may further include a network interface configured to transmit a first message including a check-in status update generated at least in part based on the check-in and to later transmit the media files in one or more additional messages associated with the check-in status update.

In general, one aspect of the subject matter described in this specification can be embodied in a computer readable media storing software including instructions executable by a processing device that upon such execution cause the processing device to perform operations that include receiving a signal indicating a check-in. The operations may further include transmitting a first message including a check-in status update generated at least in part based on the check-in. The operations may further include starting a recording session associated with the check-in. The operations may further include recording media files during the recording session. The operations may further include automatically associating the media files with the check-in. The operations may further include transmitting the media files in one or more additional messages associated with the check-in status update.

These and other embodiments can each optionally include one or more of the following features. The one or more additional messages may be transmitted to a social network server. The first message may cause the check-in status update to be published on a social network and the one or more additional messages may cause the check-in status update to be modified to include the media files. The first message may cause the check-in status update to be published on a social network and the one or more additional messages may cause the check-in status update to be modified to include a link to a second status update that includes the media files. The one or more additional messages may be transmitted after the recording session is terminated. The one or more additional messages bearing a particular media file may be automatically transmitted upon recording of the particular media file. The particular media file may be automatically published on a social network upon receipt by a social network server. The recording session may be manually terminated by a user. Using the one or more data processing apparatuses, the end of an event associated with the check-in may be detected. The recording session may be automatically terminated upon detecting the end of the event. Using the one or more data processing apparatuses, a user may be alerted upon detecting the end of the event. Using the one or more data processing apparatuses, a user may be alerted the next time a media file is recorded after detecting the end of the event. Transmissions of media files may be automatically suspended after detecting the end of the event. Detecting the end of the event may include monitoring an expiration timer that is reset each time a media file is recorded before it expires. Detecting the end of the event may include analyzing media file recording times during the recording session with a clustering algorithm. Detecting the end of the event may include comparing the geographic location of a mobile device that received the signal to its location when the signal was received. Detecting the end of the event may include comparing the geographic location of a mobile device that received the signal to its location when the latest media file was recorded during the recording session. Detecting the end of the event may include comparing the geographic location of a mobile device that received the signal to boundaries of a location associated with the check-in. Detecting the end of the event may include analyzing the geographic locations of a mobile device that received the signal when media files were recorded during the recording session with a clustering algorithm. Detecting the end of the event may include maintaining both a time based event end detector and a geographic location based event end detector. Detecting the end of the event may include weighting signals from the time based event end detector and the geographic location based event end detector using weights that are adapted based on a user's usage patterns. The media files may include a still image file. The media files may include an audio file. The media files may include a video file. Systems may include a global positioning system receiver, configured to determine location coordinates. Systems may include a module configured to detect the end of an event associated with the check-in based in part on the location coordinates. Systems may include a display configured to present a user with an alert indicating that the end of the event has been detected and suggesting the termination of the recording session. The sensor may include a camera. The sensor may include a microphone. Systems may include means for detecting the end of an event associated with the check-in. The means for detecting the end of the event may use location coordinates output from a global positioning receiver to detect the end of the event. Systems may include a module configured to estimate location coordinates based on signal strength measurements of signals received from multiple base stations and the means for detecting the end of the event may use the estimated location coordinates to detect the end of the event.

Particular embodiments of the invention can be implemented to realize none, one or more of the following advantages. Some implementations may facilitate the recording media associated with an event for sharing over a network as a collection or album. Some implementations may automatically associate media files with a check-in status update. Some implementations may detect the end of a social event to reduce the chance of media being inadvertently added to a status update.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 2 is a flow chart of an example process for recording an event album associated with a check-in.

Like reference numbers and designations in the various drawings indicate like elements.

DETAILED DESCRIPTION

Definitions

Figure 1:
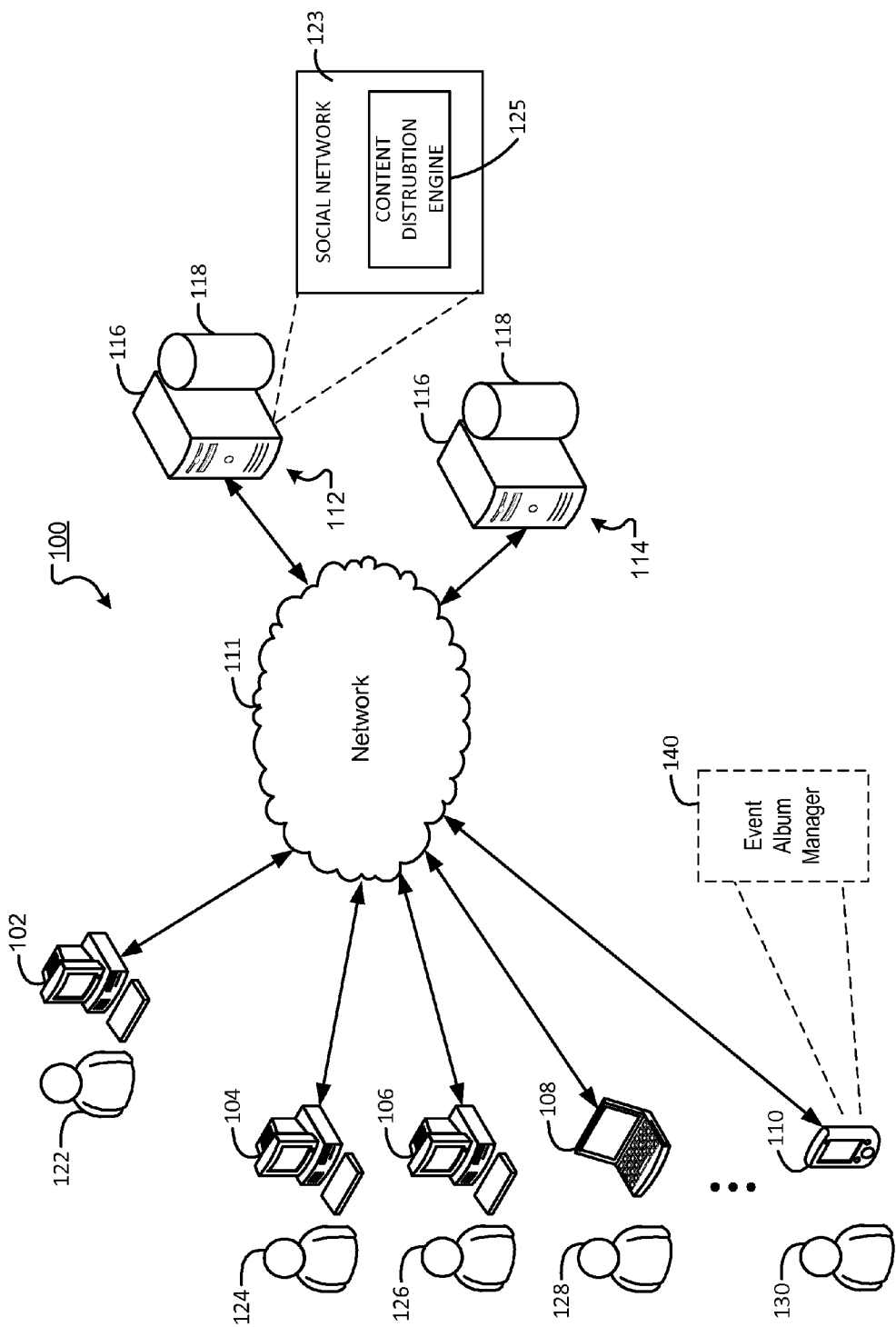
FIG. 1 is a block diagram of an example online environment.

The term "social network" as used herein encompasses its plain and ordinary meaning, including, but not limited to, a platform accessible to users through a communications network that facilitates the forming of social connections between users and the sharing of information between connected users of the platform.

The term "social media content" as used herein encompasses its plain and ordinary meaning, including, but not limited to, electronic content that is submitted to a social network. Types of electronic content include posts, links, images, digital photographs, check-ins and so forth.

The term "check-in" as used herein encompasses its plain and ordinary meaning, including, but not limited to, a submission of information specifying a venue and/or a geographic location at which a user is present.

The term "content stream" as used herein encompasses its plain and ordinary meaning, including, but not limited to, items of social media content displayed in a portion of a graphical user interface designated for display of the items of social media content.

The term "status update" as used herein encompasses its plain and ordinary meaning, including, but not limited to, a unit of social media content that reflects the current status of a user.

The term "social connection" as used herein encompasses its plain and ordinary meaning, including, but not limited to, a relationship between nodes in a graph representing users of a social networking service.

The term "clustering algorithm" as used herein encompasses its plain and ordinary meaning, including, but not limited to, a process for finding structure in a collection of unlabeled data points by classifying the data points into groups whose members are similar in some way while being dissimilar in some way to members of other groups. Types of clustering algorithms include recurrent self-organizing map, K-means clustering, growing K-means clustering and so forth.

The term "processing device" as used herein encompasses its plain and ordinary meaning, including, but not limited to, an appropriate processor and/or logic that is capable of receiving and storing data, and of communicating over a network.

Overview

When a user checks-in to announce his or her presence at a location to other users of a social network, the user may also want to further document his or her activities at the location to enhance the sharing experience or possibly encourage other uses to attend an event at the location. One way to further document those activities is by posting additional rich information about those activities in the form of media files (e.g., photos, sounds recordings, or videos). This enhanced sharing may be facilitated by a device, system, or process that automatically associates media files recorded at the check-in location or during the course of an event associated with the check-in to create a collection of media files called an event album that may be posted in the user's status update feed. The event album may be posted as an edit to the original check-in status update or in a separate status update that is linked to the check-in status update.

For example, a user attending a party at a restaurant may check-in to the restaurant location when the user arrives and may proceed to takes photos while at the party. As pictures are taken during the party they may be automatically uploaded to the social network and made available in real-time to other users with access to the user's feed. In some cases, a user may prefer to store media files recorded during the party and post the resulting event album all at once after having an opportunity to review and possibly edit the media files.

The recorded media files may be automatically associated with the check-in by starting and maintaining a recording session when the check-in occurs. When the user finishes with an event associated with the check-in, the user may terminate the recording session. The user's device may be able to detect the end of an event associated with the check-in by determining when the user, or more precisely a user's mobile device, has left the area of the check-in location or if the time between recordings increases in a way that indicates the event may have ended. Event end detection schemes may be used to automatically terminate a recording session or to alert a user and prompt the user to terminate or continue the recording session.

Example System Implementations

FIG. 1 is a block diagram showing an example of a network environment 100 on which the techniques described herein may be implemented. Network environment 100 includes computing devices 102, 104, 106, 108, 110 that are configured to communicate with a first server system 112 and/or a second server system 114 over a network 111. Computing devices 102, 104, 106, 108, 110 have respective users 122, 124, 126, 128, 130 associated therewith. The first and second server systems 112, 114 each include a computing device 116 and a machine-readable repository, or database 118. Example environment 100 may include many thousands of Web sites, computing devices and servers, which are not shown.

Network 111 may include a large computer network, examples of which include a local area network (LAN), wide area network (WAN), the Internet, a cellular network, or a combination thereof connecting a number of mobile computing devices, fixed computing devices, and server systems. The network(s) included in network 111 may provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 102, 104, 106, 108, 110 enable respective users 122, 124, 126, 128, 130 to access and to view documents, e.g., Web pages included in Web sites. For example, user 122 of computing device 102 may view a Web page using a Web browser. The Web page may be provided to computing device 102 by server system 112, server system 114 or another server system (not shown).

In example environment 100, computing devices 102, 104, 106 are illustrated as desktop-type computing devices, computing device 108 is illustrated as a laptop-type computing device 108, and computing device 110 is illustrated as a mobile computing device. It is noted, however, that computing devices 102, 104, 106, 108, 110 may include, e.g., a desktop computer, a laptop computer, a handheld computer, a television with one or more processors embedded therein and/or coupled thereto, a tablet computing device, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Users interacting with computing devices 102, 104, 106, 108, 110 can participate in a social network 123 hosted, e.g., by the server system 112, by uploading and downloading electronic content to the social network. The electronic content may include, e.g., text comments (e.g., status updates, announcements, replies), digital images, videos, audio files, and/or other appropriate information. In some implementations, information can be posted on a user's behalf by systems and/or services external to social network 123 or to server system 112. For example, the user may post a review of a movie to a movie review Web site, and with proper permissions, that Web site may cross-post that review to social network 123 on the user's behalf. The user may include, with a post, a tag, which includes a hyperlink to a discussion forum about a particular topic (e.g., the movie). The tag typically relates to the topic of the post (although that need not be the case always). The discussion forum contains posts by the user and others who have included similar tags on their posts.

Generally, users interacting with the computing devices 102, 104, 106, 108, 110 can also use social network 123 to define social circles to organize and to categorize the user's relationships to other users of the social network. The social circles become part of the user's social connections. Electronic content can be distributed to contacts within social network 123, including one or more social circles, so that such content is viewable by the indicated contacts and/or contacts, or others. In an example operation, a user of social network 123 can generate content and indicate, e.g., one or more individual social network contacts and/or social circles to which the generated content is to be distributed. During a content write-time, a content data set is transmitted from the user's client computing device (e.g., computing device 102 of FIG. 1) to a distribution hub (e.g., a content distribution engine 125), which can be provided at a server (e.g., server system 112 of FIG. 1 or elsewhere on the network). In some implementations, the content data set may include content data (e.g., text, identity of the content author, tag, uniform resource indicator (URI), timestamp data (e.g., a timestamp indicating the time that the content was generated)), distribution data (e.g., data identifying contacts and/or one or more social circles), and identification (ID) data (e.g., an ID assigned to the content data set upon generation of the content).

In some implementations, other data can be appended to content data sets. Example other data can include scoring data. In some examples, scoring data can include a social affinity score among other possible scoring data. As described in more detail below, affinity identifies the closeness of parties on a social graph.

The scoring data may be recipient specific. For example, the scoring data can include social affinity data that is provided based on respective social affinity scores between an author of the content and each recipient of the content. For example, a first user can author content and define a distribution of the content, thereby creating an underlying content data set. The distribution can include a second user and a third user, and so forth. A first social affinity score associated with a social relationship between the first user and the second user can be provided, and a second social affinity score associated with a social relationship between the first user and the third user can be provided. The first social affinity score can be different from the second social affinity score, reflecting different social relationships between the first user and the second user and the first user and the third user. The first social affinity score and the second social affinity score can be appended to the content data set and/or stored in another location while maintaining an association with the content data set.

In some implementations, the distribution data is processed to provide an access control list (ACL) that specifies which contacts within the social network are granted access to the content. In some implementations, content-associated social affinity scores can be processed to provide the ACL. For example, distribution data can indicate that content is to be accessible by, and/or distributed to, a particular user. A social affinity score can be determined for the content and can be specific to a relationship between the content recipient and the author of the content. In some examples, if the social affinity score is below a threshold score, it is determined that the content will not be accessible by, and/or distributed to, the particular user. Consequently, in this example, although the particular user had been explicitly targeted for distribution of the content by the author, the particular user is not provided in the ACL for the content. In some examples, if the social affinity score is at or above the threshold score, it is determined that the content will be accessible by, and/or distributed to, the particular user. Consequently, the particular user has been explicitly targeted for distribution of the content by the author and the particular user is provided in the ACL for the content.

Generally, the distribution hub determines end points to which the content data set is to be distributed based, e.g., on the ACL. For example, the set of contacts that may care about the content and/or that are allowed access to the content is determined based on the ACL, and the ID of the content is written to a per user/view index at the distribution hub. When fetching content to distribute to a user, the user/view index is accessed and the IDs of the various contents that the user is allowed to view are determined. The content data sets are retrieved from a data store (e.g., data store 118 of FIG. 1) and are transmitted to a client device associated with the requesting user. In some implementations, the ACL can be provided based on an overall score, a quality score and/or the social affinity score. Content may be distributed to a user's main page for inclusion in a content stream.

A user device (e.g., computing device 110) may include an event album manager 140 module. The event album manager 140 facilitates the creation and posting of event albums for check-ins. When a check-in signal is received, the event manager may initiate and maintain a recording session. During the recording session, media files that are recorded are automatically associated with the check-in and included in an event album for the check-in. The event album manager 140 may also detect the end of an event associated with check-in. When the end of an event is detected, the event album manager 140 may automatically terminate the recording session or alert a user and prompt the user to terminate or continue the recording session. During or after the recording session, media files recorded and added to the event album may be transmitted to a remote server running a social network (e.g., server system 112 running social network 123). As a result of these transmissions a check-in status update for the user may be updated to include or link to the media files in the resulting event album.

In some implementations, media files from a user's event album may be automatically associated with an event posting for a group of users of a social network, e.g., a group of users with which the user has social connections. Through a social network, a user may have a view of a combined event posting that includes all of the media files recorded for an event by all of the people in his or her "family" circle, "work friends" circle, or some combination of circles. In this way, the views of the combined event posting may be asymmetric among users. In some implementations, multiple users may create a joint event album, thereby having a shared and symmetric access to media files recorded in the joint event album.

Figure 7:
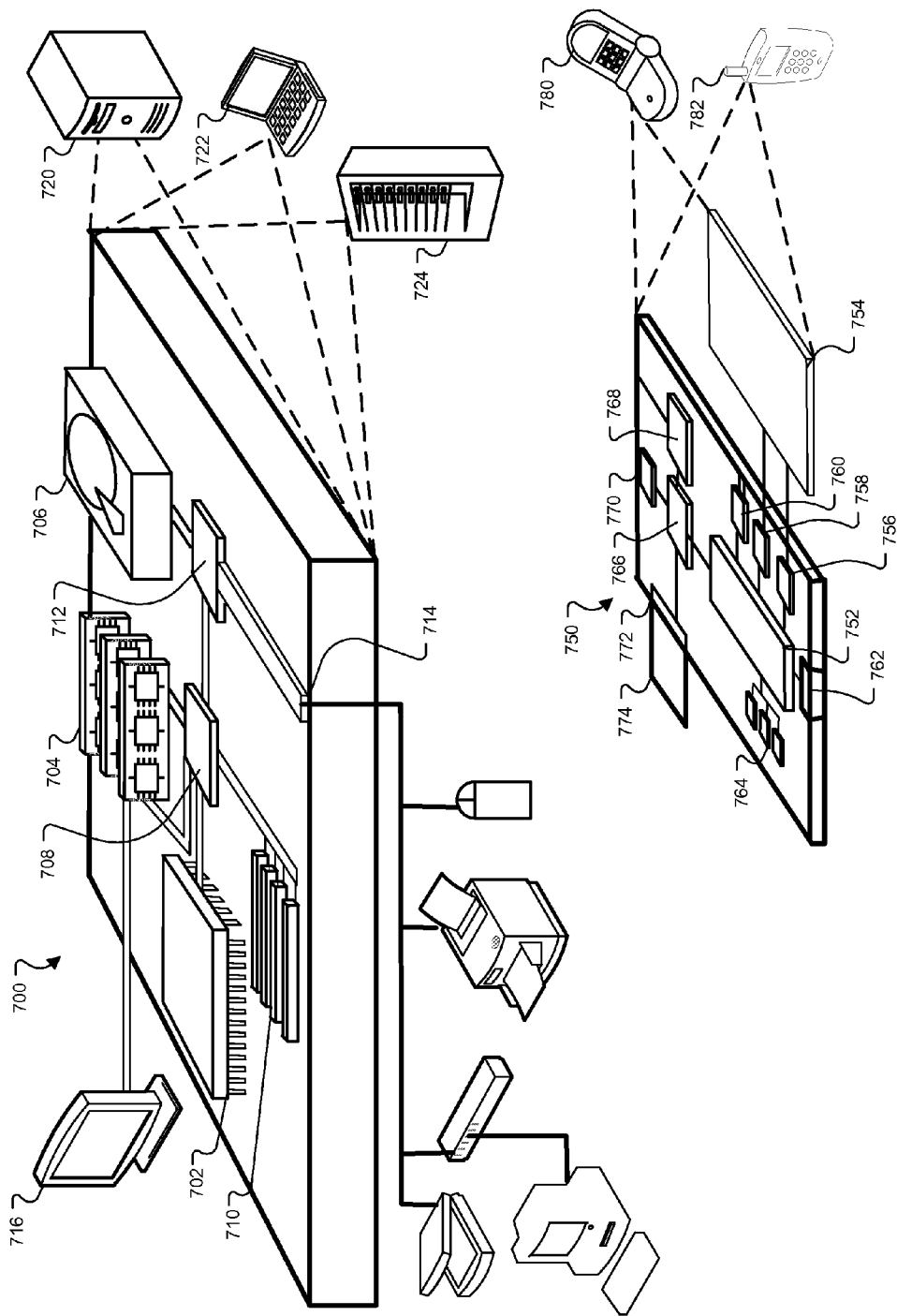
FIG. 7 shows an example of a computer device and a mobile computer device that can be used to implement the techniques described here.

The event album manager 140 may be implemented as software, hardware or a combination of software and hardware that is executed on a processing apparatus, such as one or more computing devices (e.g., a computer system as illustrated in FIG. 7).

Example Processes

Figure 2:
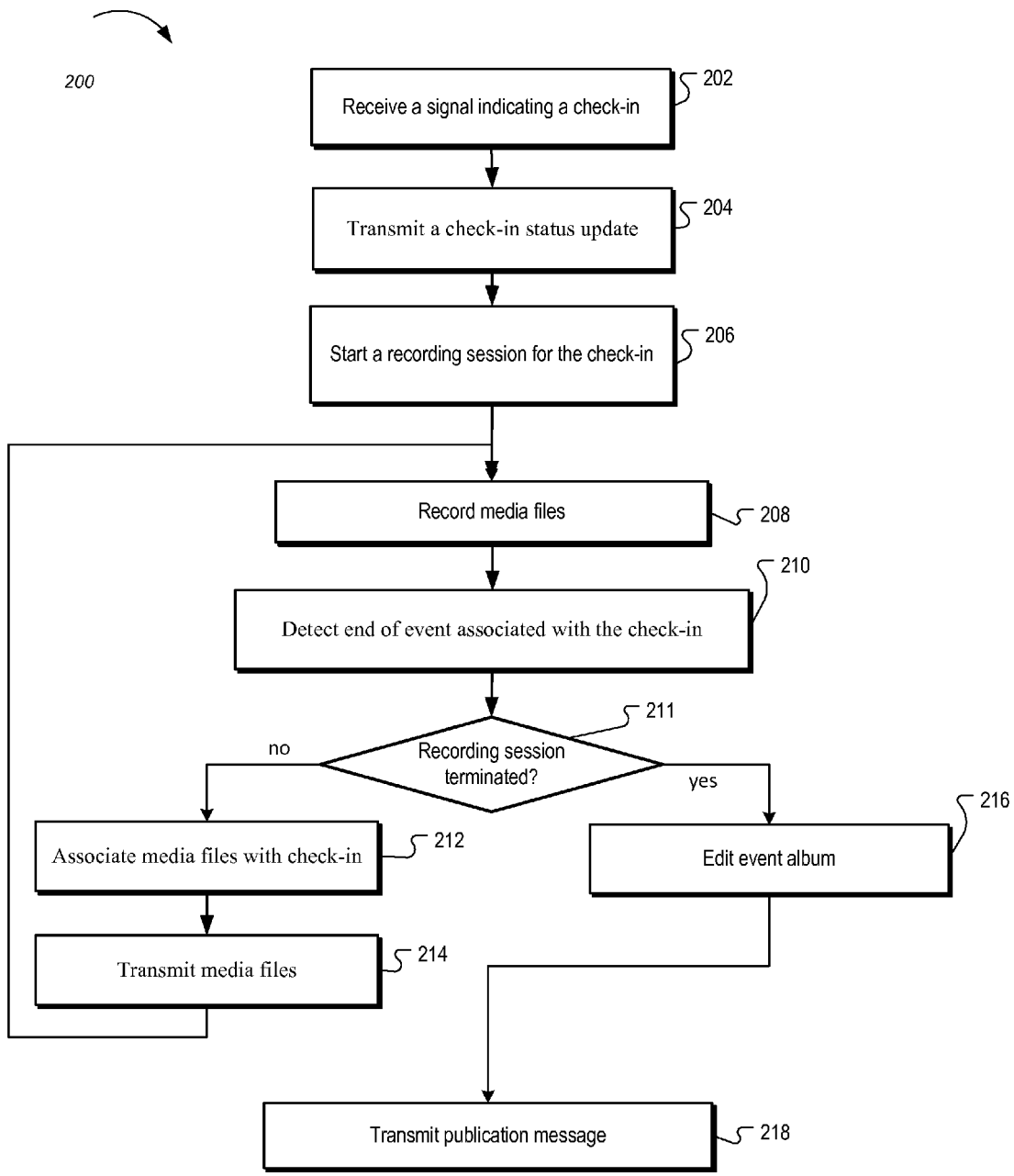

FIG. 2 is a flow chart of an example process 200 for recording an event album associated with a check-in.

The process 200 can be implemented, for example, by the event album manager 140 in the computing device 110 of FIG. 1. In some implementations, the computing device 110 is a data processing apparatus that includes one or more processors that are configured to perform actions of the process 200. For example, the data processing apparatus may be a computing device (e.g., as illustrated in FIG. 7). In some implementations, process 200 may be implemented by the event album manager 552 that is executed by the mobile device described in FIGS. 3-6. In some implementations, a computer readable medium can include instructions that when executed by a computing device (e.g., a computer system) cause the device to perform actions of the process 200.

A signal is received 202 indicating a check-in. In some implementations, a user may input a check-in signal through a user interface (e.g., a keypad, pointing device, or a touch-screen display). For example, the signal may be received through the pointing device interface 405 of mobile device depicted in FIGS. 3-6. In some implementations, the signal may be received 202 through a wireless interface (e.g., antennae interface 406 or network connection interface 407). For example, the signal reflecting a check-in may be received via a BLUETOOTH connection that connects two devices of a user, such as a tablet computing device and a camera. In some implementations, a user may be prompted to submit a check-in signal when a navigation module (e.g., navigation module 417) indicates that a user has entered a geographic location associated with a check-in opportunity. For example, a social network may designate a stadium as check-in location with geographic boundaries. When a user crosses the geographic boundaries, the user may be prompted (e.g., through display interface 402 or sound interface 409) with the option to check-in to the stadium location or an event associated with the location in order to alert members of the user's social network to the presence of the user. The user may exercise the option to check-in by through a user interface.

A message including a check-in status update based on the check-in is transmitted 204. In some implementations, the check-in status update is transmitted to a remote server (e.g., server system 112). For example, transmitting 204 the check-in status update may be accomplished by transmitting the message via a network, using a network interface (e.g., a wireless network interface including an antenna). A remote server receiving the check-in status update that hosts a social network (e.g., social network 123) may incorporate the check-in status update as an entry in a status update feed or stream for a user that is accessible by some other users of the social network.

A recording session for the check-in is started 206. During the recording session, media files that are recorded will be automatically associated with the check-in to facilitate the creation of an event album for an event associated with the check-in. In some implementations, the initiation and maintenance of a recording session and a resulting event album may be performed by a control module (e.g., event album manager 140) on user device (e.g., user device 110) that controls sensor interfaces used to record media files and associates those media files with the check-in. For example, the event album manager 620 may be instantiated on the mobile device depicted in FIGS. 3-6 and used to start 206 and maintain a recording session for a check-in.

A media file is recorded 208. For example, a media file may encode one or more still images, sounds, video, or some other recorded signal(s). In some implementations, a media file is recorded using a sensor (e.g., camera 307 or microphone 309 of the mobile device of FIG. 3).

During the recording session, analysis may be performed to detect 210 the end of an event associated with the check-in. In some implementations, the time elapsed since the check-in and/or since the last media file was recorded is monitored to detect 210 the end of the event. For example, an expiration timer may be monitored to detect the end of the event. The expiration timer may be set to an initial value (e.g., an hour) when the recording session starts or when a first media file is recorded. The expiration timer may be reset (e.g., to the initial value) each time a media file is recorded before it expires. In some implementations, the reset value of the timer may be adapted based on the timing of previous recordings. In some implementations, the end of an event associated with the check-in may be detected 210 by analyzing media file recording times during the recording session with a clustering algorithm. For example, the end of the event may be detected by determining if the time of the most recent recording is sufficiently later than a cluster of previous recordings during the recording session.

In some implementations, the end of the event may be detected 210 by monitoring the geographic location of a mobile device. For example, the geographic location of a mobile device that received the signal indicating the check-in may be compared to the location of the mobile device when the signal was received. The end of the event may be determined, if the distance is greater than threshold (e.g., 100 meters). In some implementations, the geographic location of a mobile device may be compared to the location of the mobile device when the most recent previous media file was recorded during the recording session. Again, the distance may be compared to fixed threshold, or, in some implementations, the threshold may be adapted based on the usage pattern of a user during the current recording session or during previous recording sessions.

In some implementations, the end of the event may be detected 210 by comparing the geographic location of a mobile device to boundaries of a location associated with the check-in. The boundaries of the location may be specified by a social network. For example, boundaries may be specified in a message received over a communication network from social network server (e.g., server system 112 running social network 123). The end of the event may be detected 210 by determining if the mobile device is outside of the boundaries.

In some implementations, the end of the event may be detected 210 by analyzing the geographic locations of a mobile device when media files were recorded during the recording session with a clustering algorithm (e.g., recurrent self-organizing map, K-means clustering, or growing K-means clustering). The end of the event may be detected 210 by determining if the current location is sufficiently far from a cluster of previous recording locations.

In some implementations, the end of the event may be detected 210 by monitoring both the timing of recordings and the geographic location of a mobile device. For example, the end of the event may be detected 210 by determining if either the time between successive recordings exceeds a threshold or the distance between successive recordings exceeds another threshold. A time based event end detector and a geographic location based event end detector may be maintained. In some implementations, outputs signals of the time based detector and the location based detector may be combined by weighting the output signals and adding them together. The end of the event may be detected 210 by determining if the combined detector output exceeds a threshold. In some implementations, the weights used to combine time based and location based signals may be adapted based on a user's usage patterns. For example, if the underlying event happens to occur over wide area (e.g., golfing) a user may move around substantially during the event resulting in a large number of false positive detections of the end of the event based on geographic location change. As the user provides feedback in response to end of event notifications or reminders by indicating that the event is still continuing, the weights may be adjusted to weight a time based signal more significantly than a location based signal that caused the false positives.

In some implementations, status checks (e.g. of recording times or geographic location) are performed periodically during the recording session to detect 210 the end of the event. In some implementations, these checks are performed when a new media file is recorded.

For example, detecting 210 the end of the event may be implemented by the event album manager 140 in the computing device 110. In some implementations, a global positioning system receiver is used to determine location coordinates that are used to detect the end of the event based on geographic location. For example, GPS (Global Positioning System) receiver module 770 of mobile computing device 750 may be used to determine location coordinates. In some implementations, a module (e.g., navigation module 417 or antennae interface 406) estimates location coordinates based on signal strength measurements of signals received from multiple base stations. These location coordinate estimates may be used to detect the end of the event.

A check 211 is performed to determine whether the recording session has terminated. In some cases, a recording session may be terminated manually by a user. Manual termination of the recording session may be prompted by presenting a user with an alert (e.g., via display 301 or display interface 402 of the mobile device of FIGS. 3-6) that informs the user that the end of an event has been detected and suggests termination of the associated recording session. In other cases, the recording session may be automatically terminated when the end of an event associated with the check-in is detected. In some implementations, the transmission of media files associated with the check-in may be suspended automatically upon detect of the end of the associated event.

If the end of an event is detected between recordings, a system may wait until the next recording occurs to present the user with an alert and prompt the user to terminate the recording session. In some implementations, an alert may be presented as soon as the end of the event is detected, even if it is between recordings.

When the status of the recording session is checked 211, if the recording session has not been terminated, then new media files recorded are associated 212 with the check-in and the media files may be transmitted 214.

A media file recorded during the recording session may be automatically associated 212 with the check-in by saving the media file in a data structure for an event album associated with the check-in. The event album may include a reference to the check-in (e.g., an identifier for the check-in status update that has been posted on a social network). For example, the event album, including media files associated with the check-in, may be stored in a memory (e.g., memory 764 of mobile computing device 750). In some implementations, a media file is associated 212 with the check-in by transmitting the media file in one or more messages that include a reference to the check-in status update posted on a social network and causing a remote server (e.g., server system 112) to store the media file in a data structure for an event album associated with the check-in. For example, one or more messages including a media file and reference to the check-in status update may be transmitted via a network, using a network interface (e.g., a wireless network interface including an antenna).

A media file associated with the check-in may be transmitted 214 over a network (e.g., over network 111 to remote server system 112 running social network 123). In some implementations, a newly recorded media file is transmitted as soon as it is available and may be instantly published on a social network so that it is immediately available to some other users of a social network. In some implementations, a newly recorded media file may be transmitted as soon as it is available but, rather than being published immediately, stored by a remote server (e.g., server system 112) pending completion and approval of the event album by the user. In some implementations (not shown in FIG. 2), a newly recorded media file is not transmitted immediately, but is stored locally pending completion and user approval of the event album. In this case, the media files may be transmitted together in one or more messages associated with the check-in status update after the recording session is terminated.

Transmitting 214 a media file may be accomplished by transmitting one or more messages including the media file via a network, using a network interface (e.g., a wireless network interface including an antenna). For example, a media file may be transmitted using antennae interface 406 or network connection interface 407 of the mobile device 300. After an associated media file is transmitted 218, the recording session may continue by recording 208 additional media files.

When the status of the recording session is checked 211, if the recording session has been terminated, then a user may be prompted to edit 218 an event album. For example, a user may review the event album and delete unwanted media files. In some implementations, a user may uses media editing software to modify media files. A user may indicate that editing of the event album is complete and that the event album is ready for publication. For example, a user may be prompted through a display (e.g., display interface 402) and a user may enter edits or indicate approval of the event album for publication through a user interface (e.g., keyboard interface 404 or pointing device interface 405).

A publication message may be transmitted 218 to cause media files associated with the check-in to be made accessible to other users of a social network. In some implementations, the media files have previously been transmitted to a social network server (e.g., server system 112 running social network 123) and the publication message grants the user's permission for those files to be accessed through the check-in status update or another status update that is linked to the check-in status update. Event duration information may be included with the publication message and may be added to the check-in status update along with media files or pointers to the media files. In some implementations, associated media files that were not previously transmitted are transmitted along with a publication message after the recording session is complete or after the user complete edits of the media files in the event album and approves the event album for publication. In some implementations, a publication message is transmitted 218 via a network, using a network interface (e.g., a wireless network interface including an antenna).

Example Products

Figure 3:
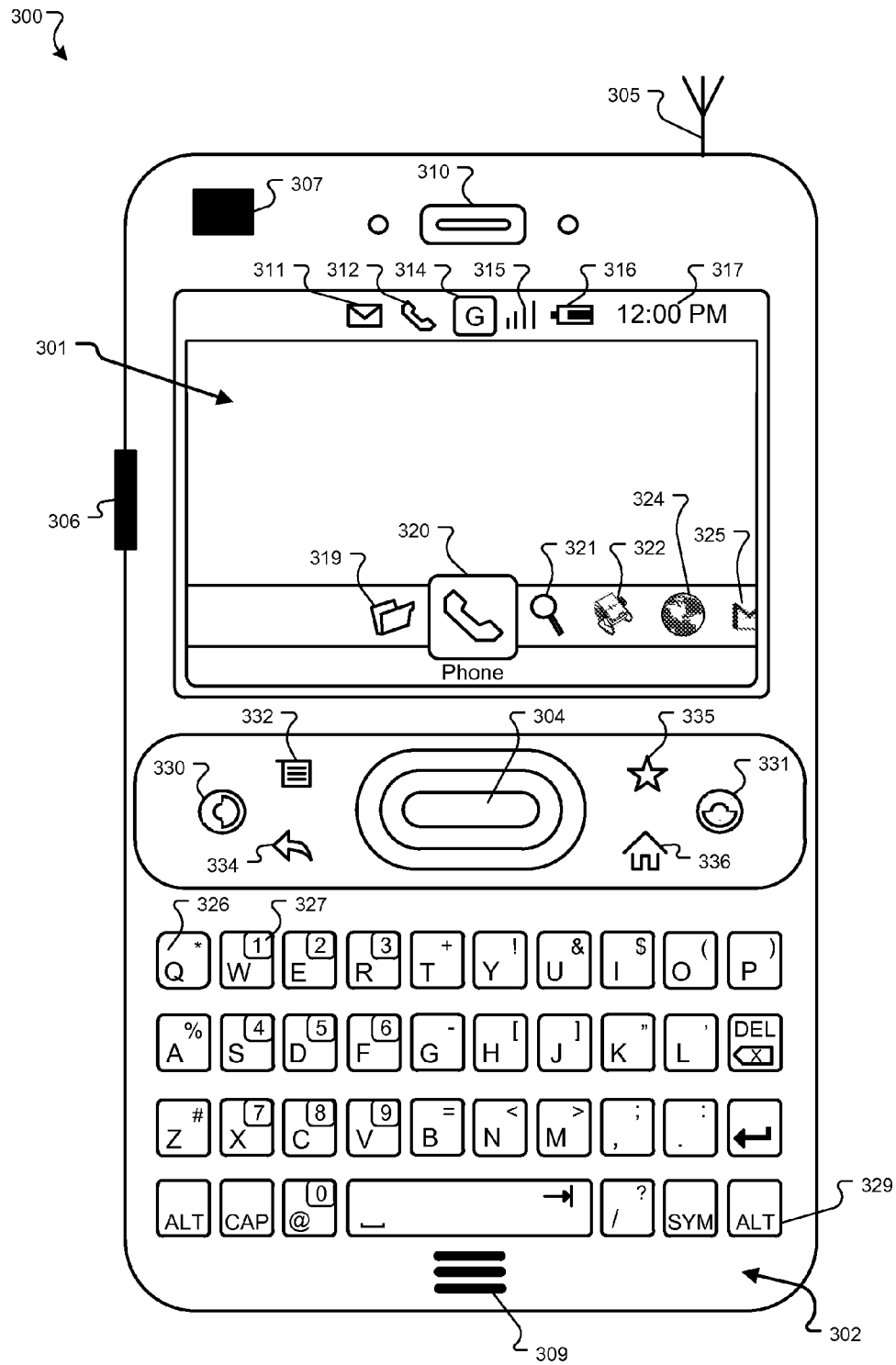
FIG. 3 is a schematic representation of an exemplary mobile device that implements embodiments of event album manager described herein.

Referring now to FIG. 3, the exterior appearance of an exemplary mobile device 300 that implements the event album manager 140 (shown in FIG. 1) is illustrated. Briefly, and among other things, the device 300 includes a processor configured to automatically associate media files recorded during an event with a corresponding check-in by creating an event album that may be posted on a social network in a status update for the check-in.

In more detail, the hardware environment of the device 300 includes a display 301 for displaying text, images, and video to a user; a keyboard 302 for entering text data and user commands into the device 300; a pointing device 304 for pointing, selecting, and adjusting objects displayed on the display 301; an antenna 305; a network connection 306; a camera 307; a microphone 309; and a speaker 310. Although the device 300 shows an external antenna 305, the device 300 can include an internal antenna, which is not visible to the user.

The display 301 can display video, graphics, images, and text that make up the user interface for the software applications used by the device 300, and the operating system programs used to operate the device 300. Among the possible elements that may be displayed on the display 301 are a new mail indicator 311 that alerts a user to the presence of a new message; an active call indicator 312 that indicates that a telephone call is being received, placed, or is occurring; a data standard indicator 314 that indicates the data standard currently being used by the device 300 to transmit and receive data; a signal strength indicator 315 that indicates a measurement of the strength of a signal received by via the antenna 305, such as by using signal strength bars; a battery life indicator 316 that indicates a measurement of the remaining battery life; or a clock 317 that outputs the current time.

The display 301 may also show application icons representing various applications available to the user, such as a web browser application icon 319, a phone application icon 320, a search application icon 321, a contacts application icon 322, a mapping application icon 324, an email application icon 325, or other application icons. In one example implementation, the display 301 is a quarter video graphics array (QVGA) thin film transistor (TFT) liquid crystal display (LCD), capable of 16-bit or better color.

A user uses the keyboard (or "keypad") 302 to enter commands and data to operate and control the operating system and applications that provide for interaction with event album manager systems. The keyboard 302 includes standard keyboard buttons or keys associated with alphanumeric characters, such as keys 326 and 327 that are associated with the alphanumeric characters "Q" and "W" when selected alone, or are associated with the characters "*" and "1" when pressed in combination with key 329. A single key may also be associated with special characters or functions, including unlabeled functions, based upon the state of the operating system or applications invoked by the operating system. For example, when an application calls for the input of a numeric character, a selection of the key 327 alone may cause a "1" to be input.

In addition to keys traditionally associated with an alphanumeric keypad, the keyboard 302 also includes other special function keys, such as an establish call key 330 that causes a received call to be answered or a new call to be originated; a terminate call key 331 that causes the termination of an active call; a drop down menu key 332 that causes a menu to appear within the display 301; a backward navigation key 334 that causes a previously accessed network address to be accessed again; a favorites key 335 that causes an active web page to be placed in a bookmarks folder of favorite sites, or causes a bookmarks folder to appear; a home page key 336 that causes an application invoked on the device 300 to navigate to a predetermined network address; or other keys that provide for multiple-way navigation, application selection, and power and volume control.

The user uses the pointing device 304 to select and adjust graphics and text objects displayed on the display 301 as part of the interaction with and control of the device 300 and the applications invoked on the device 300. The pointing device 304 is any appropriate type of pointing device, and may be a joystick, a trackball, a touch-pad, a camera, a voice input device, a touch screen device implemented in combination with the display 301, or any other input device.

The antenna 305, which can be an external antenna or an internal antenna, is a directional or omni-directional antenna used for the transmission and reception of radiofrequency (RF) signals that implement point-to-point radio communication, wireless local area network (LAN) communication, or location determination. The antenna 305 may facilitate point-to-point radio communication using the Specialized Mobile Radio (SMR), cellular, or Personal Communication Service (PCS) frequency bands, and may implement the transmission of data using any number or data standards. For example, the antenna 305 may allow data to be transmitted between the device 300 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with a QUALCOMM RTR6285™ transceiver and PM7540™ power management circuit.

The wireless or wired computer network connection 306 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 306 may connect to a LAN network, a corporate or government WAN network, the Internet, a telephone network, or other network. The network connection 306 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, an IEEE-1394 FIREWIRE connector, a Universal Serial Bus (USB) connector (including a mini-B USB interface connector), a serial port connector, a parallel port connector, or other wired connector. In another implementation, the functions of the network connection 306 and the antenna 305 are integrated into a single component.

The camera 307 allows the device 300 to capture digital images, and may be a scanner, a digital still camera, a digital video camera, or other digital input device. In one example implementation, the camera 307 is a 3 mega-pixel (MP) camera that utilizes a complementary metal-oxide semiconductor (CMOS).

The microphone 309 allows the device 300 to capture sound, and may be an omni-directional microphone, a unidirectional microphone, a bi-directional microphone, a shotgun microphone, or other type of apparatus that converts sound to an electrical signal. The microphone 309 may be used to capture sound generated by a user, for example when the user is speaking to another user during a telephone call via the device 300. Conversely, the speaker 310 allows the device to convert an electrical signal into sound, such as a voice from another user generated by a telephone application program, or a ring tone generated from a ring tone application program. Furthermore, although the device 300 is illustrated in FIG. 3 as a handheld device, in further implementations the device 300 may be a laptop, a workstation, a midrange computer, a mainframe, an embedded system, telephone, desktop PC, a tablet computer, a PDA, or other type of computing device.

Figure 4:
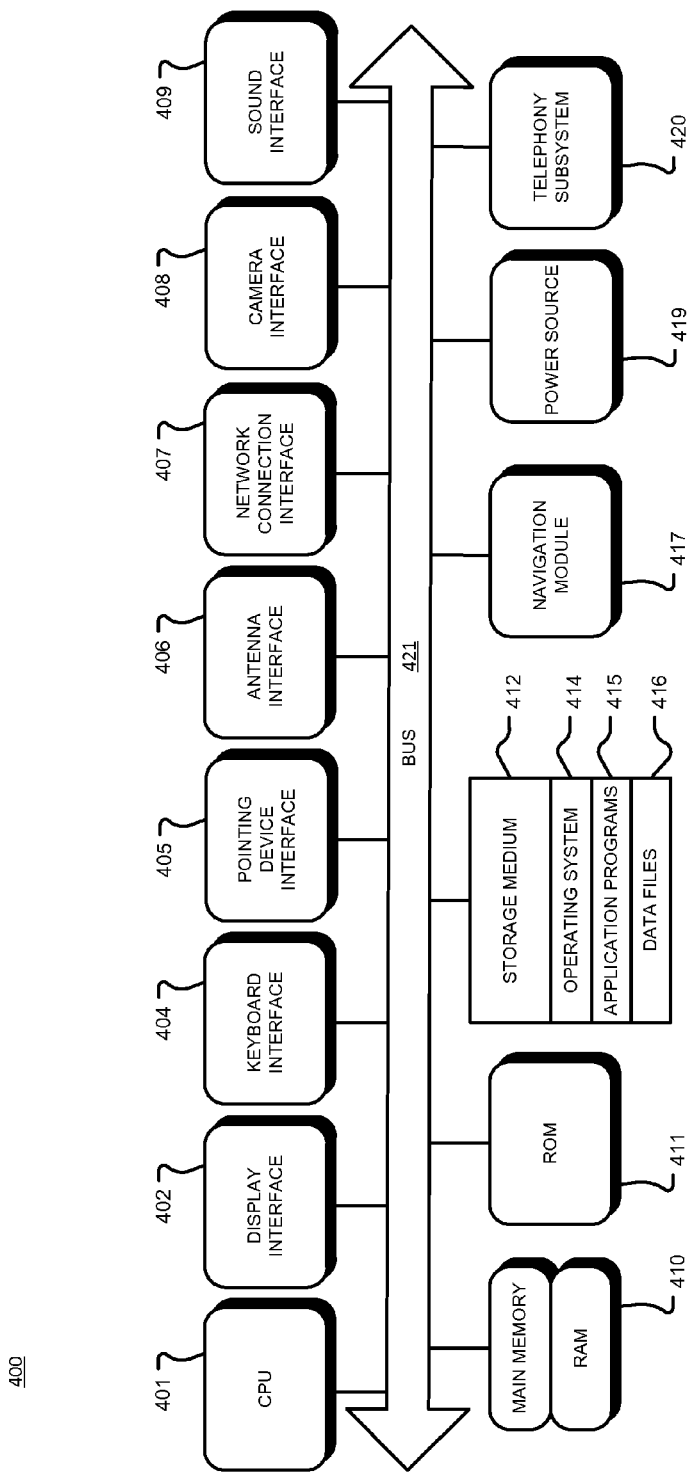
FIG. 4 is a block diagram illustrating the internal architecture of the device of FIG. 3.

FIG. 4 is a block diagram illustrating an internal architecture 400 of the device 300. The architecture includes a central processing unit (CPU) 401 where the computer instructions that comprise an operating system or an application are processed; a display interface 402 that provides a communication interface and processing functions for rendering video, graphics, images, and texts on the display 301, provides a set of built-in controls (such as buttons, text and lists), and supports diverse screen sizes; a keyboard interface 404 that provides a communication interface to the keyboard 302; a pointing device interface 405 that provides a communication interface to the pointing device 304; an antenna interface 406 that provides a communication interface to the antenna 305; a network connection interface 407 that provides a communication interface to a network over the computer network connection 306; a camera interface 408 that provides a communication interface and processing functions for capturing digital images from the camera 307; a sound interface 409 that provides a communication interface for converting sound into electrical signals using the microphone 309 and for converting electrical signals into sound using the speaker 310; a random access memory (RAM) 410 where computer instructions and data are stored in a volatile memory device for processing by the CPU 401; a read-only memory (ROM) 411 where invariant low-level systems code or data for basic system functions such as basic input and output (I/O), startup, or reception of keystrokes from the keyboard 302 are stored in a non-volatile memory device; a storage medium 412 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 414, application programs 415 (including, for example, a web browser application, a widget or gadget engine, and or other applications, as necessary) and data files 416 are stored; a navigation module 417 that provides a real-world or relative position or geographic location of the device 300; a power source 419 that provides an appropriate alternating current (AC) or direct current (DC) to power components; and a telephony subsystem 420 that allows the device 300 to transmit and receive sound over a telephone network. The constituent devices and the CPU 401 communicate with each other over a bus 421.

The CPU 401 can be one of a number of computer processors. In one arrangement, the computer CPU 401 is more than one processing unit. The RAM 410 interfaces with the computer bus 421 so as to provide quick RAM storage to the CPU 401 during the execution of software programs such as the operating system application programs, and device drivers. More specifically, the CPU 401 loads computer-executable process steps from the storage medium 412 or other media into a field of the RAM 410 in order to execute software programs. Data is stored in the RAM 410, where the data is accessed by the computer CPU 401 during execution. In one example configuration, the device 300 includes at least 128 MB of RAM, and 256 MB of flash memory.

The storage medium 412 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300, or to upload data onto the device 300.

A computer program product is tangibly embodied in storage medium 412, a machine-readable storage medium. The computer program product includes instructions that, when read by a machine, operate to cause a data processing apparatus to store image data in the mobile device. In some embodiments, the computer program product includes instructions that cause a data processing apparatus to record an event album associated with a check-in.

The operating system 414 may be a LINUX-based operating system such as a mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 414 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 414, and the application programs 415 such as an email, instant messaging, a video service application, a mapping application word processing, spreadsheet, presentation, gaming, mapping, web browsing, JAVASCRIPT engine, or other applications. For example, one implementation may allow a user to access the GMAIL email application, an instant messaging application, a video service application, a mapping application, or an imaging editing and presentation application. The application programs 415 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, a gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for event album creation for check-ins using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 417 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 417 may also be used to measure angular displacement, orientation, or velocity of the device 300, such as by using one or more accelerometers.

Figure 5:
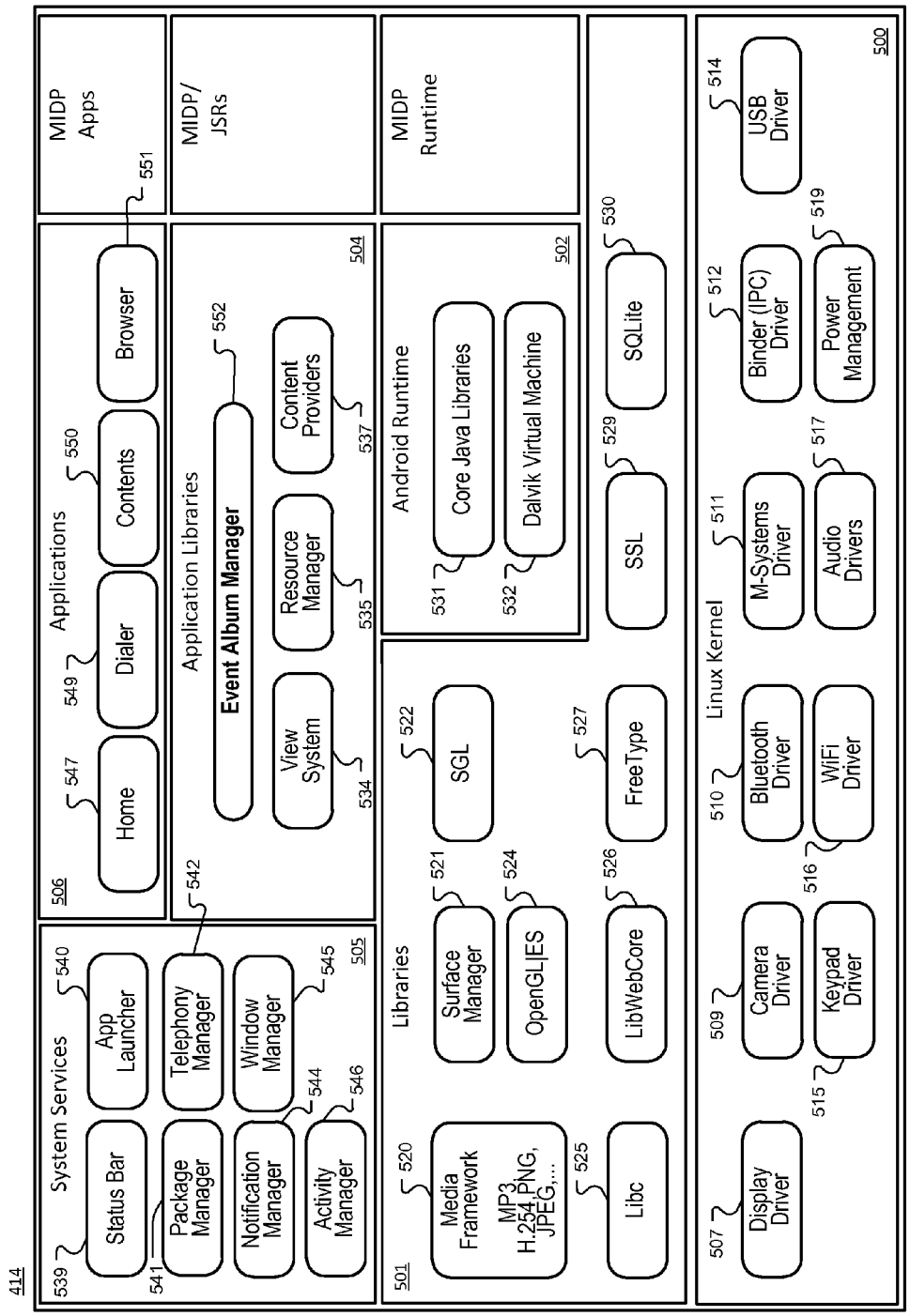
FIG. 5 is a block diagram illustrating exemplary components of the operating system used by the device of FIG. 3.

FIG. 5 is a block diagram illustrating exemplary components of the operating system 414 used by the device 300, in the case where the operating system 414 is a mobile device platform. The operating system 414 invokes multiple processes, while ensuring that the associated phone application is responsive, and that wayward applications do not cause a fault (or "crash") of the operating system. Using task switching, the operating system 414 allows for the switching of applications while on a telephone call, without losing the state of each associated application. The operating system 414 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 414 can generally be organized into six components: a kernel 500, libraries 501, an operating system runtime 502, application libraries 504, system services 505, and applications 506. The kernel 500 includes a display driver 507 that allows software such as the operating system 414 and the application programs 415 to interact with the display 301 via the display interface 402, a camera driver 509 that allows the software to interact with the camera 307; a BLUETOOTH driver 510; a M-Systems driver 511; a binder (IPC) driver 512, a USB driver 514 a keypad driver 515 that allows the software to interact with the keyboard 302 via the keyboard interface 404; a WiFi driver 516; audio drivers 517 that allow the software to interact with the microphone 309 and the speaker 310 via the sound interface 409; and a power management component 519 that allows the software to interact with and manage the power source 519.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 501 include a media framework 520 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 521; a simple graphics library (SGL) 522 for two-dimensional application drawing; an Open Graphics Library for Embedded Systems (OpenGL ES) 524 for gaming and three-dimensional rendering; a C standard library (LIBC) 525; a LIBWEBCORE library 526; a FreeType library 527; an SSL 529; and an SQLite library 530.

The operating system runtime 502 includes core JAVA libraries 531, and a Dalvik virtual machine 532. The Dalvik virtual machine 532 is a custom, virtual machine that runs a customized file format (.DEX).

The operating system 414 can also include Mobile Information Device Profile (MIDP) components such as the MIDP JAVA Specification Requests (JSRs) components, MIDP runtime, and MIDP applications as shown in FIG. 5. The MIDP components can support MIDP applications running on the device 300.

With regard to graphics rendering, a system-wide composer manages surfaces and a frame buffer and handles window transitions, using the OpenGL ES 524 and two-dimensional hardware accelerators for its compositions.

The Dalvik virtual machine 532 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 504 include a view system 534, a resource manager 535, content providers 537, and an event album manager 552. The system services 505 includes a status bar 539; an application launcher 540; a package manager 541 that maintains information for all installed applications; a telephony manager 542 that provides an application level JAVA interface to the telephony subsystem 420; a notification manager 544 that allows all applications access to the status bar and on-screen notifications; a window manager 545 that allows multiple applications with multiple windows to share the display 301; and an activity manager 546 that runs each application in a separate process, manages an application life cycle, and maintains a cross-application history.

The applications 506 include a home application 547, a dialer application 549, a contacts application 550, and a browser application 551.

The telephony manager 542 provides event notifications (such as phone state, network state, Subscriber Identity Module (SIM) status, or voicemail status), allows access to state information (such as network information, SIM information, or voicemail presence), initiates calls, and queries and controls the call state. The browser application 551 renders web pages in a full, desktop-like manager, including navigation functions. Furthermore, the browser application 551 allows single column, small screen rendering, and provides for the embedding of HTML views into other applications.

Figure 6:
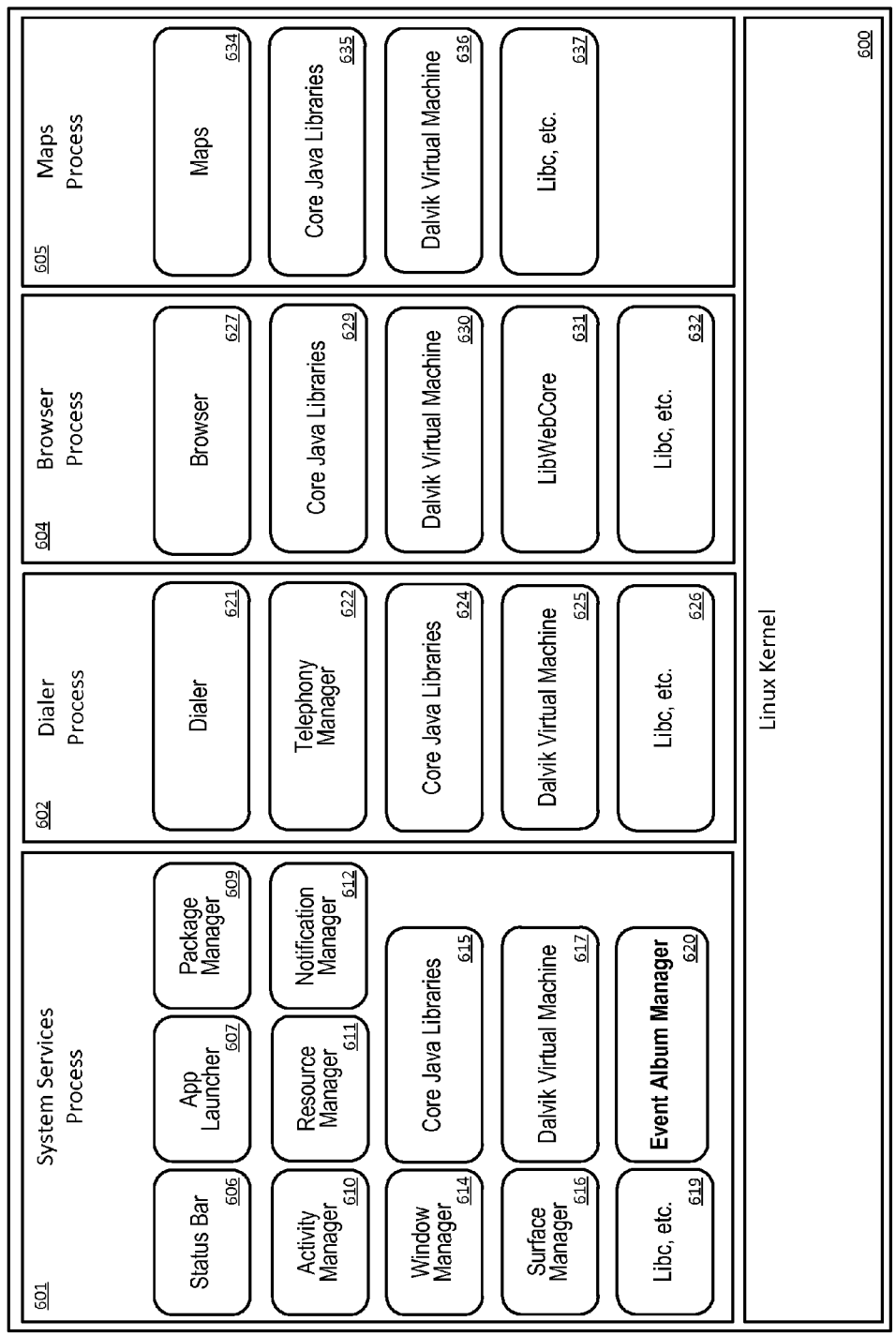
FIG. 6 is a block diagram illustrating exemplary processes implemented by the operating system kernel of FIG. 5.

FIG. 6 is a block diagram illustrating exemplary processes implemented by the operating system kernel 600. Generally, applications and system services run in separate processes, where the activity manager 546 runs each application in a separate process and manage the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 616, the window manager 614, or the activity manager 610 can be continuously executed while the device 300 is powered. Additionally, some application-specific process can also be persistent. For example, processes associated with the dialer application 621, may also be persistent.

The processes implemented by the operating system kernel 600 may generally be categorized as system services processes 601, dialer processes 602, browser processes 604, and maps processes 605. The system services processes 601 include status bar processes 606 associated with the status bar 539; application launcher processes 607 associated with the application launcher 540; package manager processes 609 associated with the package manager 541; activity manager processes 610 associated with the activity manager 546; resource manager processes 611 associated with a resource manager 611 that provides access to graphics, localized strings, and XML layout descriptions; notification manger processes 612 associated with the notification manager 544; window manager processes 614 associated with the window manager 545; core JAVA libraries processes 615 associated with the core JAVA libraries 531; surface manager processes 616 associated with the surface manager 521; Dalvik virtual machine processes 617 associated with the Dalvik virtual machine 532, LIBC processes 619 associated with the LIBC library 525; and event album manager processes 620 associated with the event album manager application library 552.

The dialer processes 602 include dialer application processes 621 associated with the dialer application 549; telephony manager processes 622 associated with the telephony manager 542; core JAVA libraries processes 624 associated with the core JAVA libraries 531; Dalvik virtual machine processes 625 associated with the Dalvik Virtual machine 532; and LIBC processes 626 associated with the LIBC library 525. The browser processes 604 include browser application processes 627 associated with the browser application 551; core JAVA libraries processes 629 associated with the core JAVA libraries 531; Dalvik virtual machine processes 630 associated with the Dalvik virtual machine 532; LIBWEBCORE processes 631 associated with the LIBWEBCORE library 526; and LIBC processes 632 associated with the LIBC library 525.

The maps processes 605 include maps application processes 634, core JAVA libraries processes 635, Dalvik virtual machine processes 636, and LIBC processes 637. Notably, some processes, such as the Dalvik virtual machine processes, may exist within one or more of the system services processes 601, the dialer processes 602, the browser processes 604, and the maps processes 605.

Example Alternative System Implementations

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, portions of the event album manager system may be implemented on multiple devices (e.g., a portion on mobile device 300 and a portion on remote server system 112). An event manager that runs in part on a remote server may adapt event end detection module parameters to a particular location associated with check-ins based on usage data from many users who have checked-in the particular location.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for recording events in social media content, the method comprising:
  receiving, by one or more data processing apparatuses, a signal indicating a check-in;
  transmitting, by at least one of the one or more data processing apparatuses, a first message including a check-in status update generated at least in part based on the check-in;
  starting, by at least one of the one or more data processing apparatuses, a recording session associated with the check-in;
  recording, by at least one of the one or more data processing apparatuses, media files during the recording session;
  automatically associating the media files with the check-in; and
  transmitting, by at least one of the one or more data processing apparatuses, the media files in one or more additional messages associated with the check-in status update.

2. The method of claim 1, wherein the one or more additional messages are transmitted to a social network server.

3. The method of claim 1, wherein the first message causes the check-in status update to be published on a social network and the one or more additional messages cause the check-in status update to be modified to include the media files.

4. The method of claim 1, wherein first message causes the check-in status update to be published on a social network and the one or more additional messages cause the check-in status update to be modified to include a link to a second status update that includes the media files.

5. The method of claim 1, wherein the one or more additional messages are transmitted after the recording session is terminated.

6. The method of claim 1, wherein the one or more additional messages bearing a particular media file are automatically transmitted upon recording of the particular media file.

7. The method of claim 6, wherein the particular media file is automatically published on a social network upon receipt by a social network server.

8. The method of claim 1, wherein the recording session is manually terminated by a user.

9. The method of claim 1, further comprising:
  detecting, by at least one of the one or more data processing apparatuses, the end of an event associated with the check-in.

10. The method of claim 9, further comprising:
  automatically terminating the recording session upon detecting the end of the event.

11. The method of claim 9, further comprising:
  alerting, by at least one of the one or more data processing apparatuses, a user upon detecting the end of the event.

12. The method of claim 9, further comprising:
  alerting, by at least one of the one or more data processing apparatuses, a user the next time a media file is recorded after detecting the end of the event.

13. The method of claim 9, further comprising:
  automatically suspending transmissions of media files after detecting the end of the event.

14. The method of claim 9, wherein detecting the end of the event comprises monitoring an expiration timer that is reset each time a media file is recorded before it expires.

15. The method of claim 9, wherein detecting the end of the event comprises analyzing media file recording times during the recording session with a clustering algorithm.

16. The method of claim 9, wherein detecting the end of the event comprises comparing the geographic location of a mobile device that received the signal to its location when the signal was received.

17. The method of claim 9, wherein detecting the end of the event comprises comparing the geographic location of a mobile device that received the signal to its location when the latest media file was recorded during the recording session.

18. The method of claim 9, wherein detecting the end of the event comprises comparing the geographic location of a mobile device that received the signal to boundaries of a location associated with the check-in.

19. The method of claim 9, wherein detecting the end of the event comprises analyzing the geographic locations of a mobile device that received the signal when media files were recorded during the recording session with a clustering algorithm.

20. The method of claim 9, wherein detecting the end of the event comprises maintaining both a time based event end detector and a geographic location based event end detector.

21. The method of claim 20, wherein detecting the end of the event further comprises:
  weighting signals from the time based event end detector and the geographic location based event end detector using weights that are adapted based on a user's usage patterns.

22. The method of claim 1, wherein the media files include a still image file.

23. The method of claim 1, wherein the media files include an audio file.

24. The method of claim 1, wherein the media files include a video file.

25. A mobile device, comprising:
  a user interface configured to receive a signal indicating a check-in;
  a sensor configured to record media files during a recording session;
  a data processing apparatus; and
  a memory coupled to the data processing apparatus having instructions stored thereon which, when executed by the data processing apparatus cause the data processing apparatus to perform operations comprising:
    starting the recording session associated with the check-in;

automatically associating the media files recorded by the sensor during the recording session with the check-in; and a wireless network interface configured to transmit a first message including a check-in status update generated at least in part based on the check-in and to later transmit the media files in one or more additional messages associated with the check-in status update.

26. The mobile device of claim 25, further comprising:
a global positioning system receiver, configured to determine location coordinates; and
wherein the instructions stored on the memory when executed by the data processing apparatus further cause the data processing apparatus to perform operations comprising detecting the end of an event associated with the check-in based in part on the location coordinates.

27. The mobile device of claim 26, further comprising a display configured to present a user with an alert indicating that the end of the event has been detected and suggesting the termination of the recording session.

28. The mobile device of claim 25, wherein the sensor includes a camera.

29. The mobile device of claim 25, wherein the sensor includes a microphone.

30. A system, comprising:
a data processing apparatus; and
a memory coupled to the data processing apparatus having instructions stored thereon which, when executed by the data processing apparatus cause the data processing apparatus to perform operations comprising:
receiving a signal indicating a check-in;
transmitting a first message including a check-in status update generated at least in part based on the check-in;
starting a recording session associated with the check-in;
recording media files during the recording session;
automatically associating the media files with the check-in; and
transmitting the media files in one or more additional messages associated with the check-in status update.

31. A system, comprising:
a user interface configured to receive a signal indicating a check-in;
a sensor configured to record media files during a recording session;
a data processing apparatus; and
a memory coupled to the data processing apparatus having instructions stored thereon which, when executed by the data processing apparatus cause the data processing apparatus to perform operations comprising:
starting the recording session associated with the check-in;
automatically associating the media files recorded by the sensor during the recording session with the check-in; and
a network interface configured to transmit a first message including a check-in status update generated at least in part based on the check-in and to later transmit the media files in one or more additional messages associated with the check-in status update.

32. The system of claim 31, wherein the instructions stored on the memory, which when executed by the data processing apparatus further cause the data processing apparatus to perform operations comprising detecting the end of an event associated with the check-in.

33. The system of claim 32, further comprising:
a global positioning system receiver and wherein the detecting the end of the event uses location coordinates output from the global positioning receiver to detect the end of the event.

34. The system of claim 32, further comprising an antennae interface configured to estimate location coordinates based on signal strength measurements of signals received from multiple base stations and wherein the detecting the end of the event uses the estimated location coordinates to detect the end of the event.

35. A non-transient computer readable medium storing software comprising instructions executable by a processing device that upon such execution cause the processing device to perform operations comprising:
receiving a signal indicating a check-in;
transmitting a first message including a check-in status update generated at least in part based on the check-in;
starting a recording session associated with the check-in;
recording media files during the recording session;
automatically associating the media files with the check-in; and
transmitting the media files in one or more additional messages associated with the check-in status update.

* * * * *